United States Patent
Eicher et al.

(10) Patent No.: US 9,138,739 B2
(45) Date of Patent: Sep. 22, 2015

(54) METHOD FOR INHIBITING NITROSAMINE FORMATION IN ANION EXCHANGE RESINS

(75) Inventors: Chris Raymond Eicher, Midland, MI (US); Daryl John Gisch, Midland, MI (US); Harlan Robert Goltz, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 131 days.

(21) Appl. No.: 13/337,736

(22) Filed: Dec. 27, 2011

(65) Prior Publication Data

US 2012/0172464 A1    Jul. 5, 2012

Related U.S. Application Data

(60) Provisional application No. 61/427,899, filed on Dec. 29, 2010.

(51) Int. Cl.
| | |
|---|---|
| *B01J 47/04* | (2006.01) |
| *B01J 39/04* | (2006.01) |
| *B01J 39/18* | (2006.01) |
| *B01J 41/04* | (2006.01) |
| *C02F 1/42* | (2006.01) |
| *C02F 101/38* | (2006.01) |
| *C02F 101/16* | (2006.01) |

(52) U.S. Cl.
CPC .............. *B01J 39/043* (2013.01); *B01J 39/185* (2013.01); *B01J 41/043* (2013.01); *B01J 47/04* (2013.01); *C02F 1/42* (2013.01); *C02F 2001/422* (2013.01); *C02F 2101/16* (2013.01); *C02F 2101/38* (2013.01)

(58) Field of Classification Search
USPC ........................................ 521/28; 106/287.26
See application file for complete search history.

(56) References Cited

U.S. PATENT DOCUMENTS

| | | | | |
|---|---|---|---|---|
| 2,341,907 | A * | 2/1944 | Cheetham et al. ............ | 210/683 |
| 4,973,607 | A * | 11/1990 | Stahlbush et al. ................ | 521/28 |
| 5,152,986 | A * | 10/1992 | Lange et al. ................ | 424/78.14 |
| 5,500,126 | A * | 3/1996 | Fries .............................. | 210/668 |
| 6,456,683 | B1 | 9/2002 | Izumi et al. | |
| 2006/0060537 | A1 | 3/2006 | Takihara et al. | |
| 2008/0163793 | A1 * | 7/2008 | Gernon et al. ............ | 106/287.26 |
| 2008/0319237 | A1 * | 12/2008 | Stahlbush et al. ............. | 568/728 |

FOREIGN PATENT DOCUMENTS

GB            776664      *   6/1957

OTHER PUBLICATIONS

Jerome M. Kemper, Paul Westerhoff, Aaron Dotson and William A. MtTCH; Nitrosamine, Dimethylnitramine and Chloropicrin Formation during Strong Base Anion-Exchange Treatment, Environmental Science and Technology, vol. 43, No. 2, pp. 466-472 (2009).*
William A. Mitch, Jonathan O. Sharp, R. Rhodes Trussell, Richard L. Valentine, Lisa Alvarez-Cohen and David L. Sedlak; N-Nitrosodimethylamine (NDMA) as a Drinking Water Contaminant: A Review, Environmental Engineering Science, vol. 20, No. 5, pp. 389-404 (2003).*
Douglass, et al., "The chemistry of nitrosamine formation, inhibition and destruction", J. Soc. Cosmet. Chem., vol. 29, pp. 581-606 (1978).*
Walter I. Kimoto, et al; Role of Strong Ion Exchange Resins in Nitrosamine Formation in Water; Water Research, Jan. 1, 1980, vol. 14, pp. 869-876, XP55023879.
T. A. Gough, et al; Volatile Nitrosamines From Ion Exchange Resins; Fd. Cosmet. Toxicol., Apr. 5, 1077, pp. 437-440, XP55023880.
Issam Najm, et al; NDMA Formation in Water and Wastewater; American Water Works Association; Journal American Water Works Association, Denver, CO, US, vol. 93, Jan. 1, 2001, pp. 92-99, XP008150364.
William A. Mitch, Jonathan O. Sharp, R. Rhodes Trussell, Richard L. Valentine, Lisa Alvarez-Cohen and David L. Sedlak; N-Nitrosodimethylamine (NDMA) as a Drinking Water Contaminant: A Review, Environmental Engineering Science, vol. 20, No. 5, 2003.
Jerome M. Kemper, Paul Westerhoff, Aaron Dotson and William A. Mitch; Nitrosamine, Dimethylnitramine and Chloropicrin Formation during Strong Base Anion-Exchange Treatment, Environmental Science and Technology, vol. 43, No. 2, 2009.

* cited by examiner

*Primary Examiner* — Peter D Mulcahy
*Assistant Examiner* — Henry Hu
(74) *Attorney, Agent, or Firm* — Carl P. Hemenway; Tifani M. Edwards

(57) ABSTRACT

A method for inhibiting formation of nitrosamines and an anion exchange resin produced therefrom comprising providing an anion exchange resin with a nitrosating agent and mixing a cation exchange resin with the anion exchange resin to inhibit formation of nitrosamines on the anion exchange resin.

6 Claims, No Drawings

METHOD FOR INHIBITING NITROSAMINE FORMATION IN ANION EXCHANGE RESINS

This invention relates to methods for controlling nitrosamine formation in resins. More particularly, this invention relates to methods for inhibiting nitrosamine formation in anion exchange resins by adding a cation exchange resin.

Nitrosamines are known as N-nitrosamines or N-nitrosodialkylamines. There are many types, but one common feature is NNO functionality. Some types of nitrosamines have been demonstrated to cause cancer in laboratory animals as exposed in different ways, including through food, inhalation, dermal contact, and drinking water. According to the California Department of Public Health (CDPH), http://www.cdph.ca.gov, levels above 10 ng/L (nanograms per liter) may be of concern.

Trace nitrosamines (i.e., >10 ng/L) that develop in stored and initially installed anion exchange resins have been found and are particularly undesirable in potable water applications. For applications like perchlorate and nitrate remediation, many governmental agencies require that anion exchange resins be pre-washed and tested for any contribution of various nitrosamines at the point of installation. Pre-washing is an added expense in both time and water utilization as in some cases up to 200 bed volumes of water has been required to meet required test levels for nitrosamines.

Nitrosation may be inhibited by using additives that can compete for the active nitrosating intermediate, or nitrosating agent. Antioxidants have also been used to control total organic carbon and color throw in gel cation resins and strong acid cation resins. See, Gisch, Daryl J., "The Effectiveness of Various Food Acceptable Antioxidants for Controlling Leachable Total Organic Carbon (TOC) and Color Throw on Stored Strong Acid Gel Cation Resins," http://priorartdatabase.com/IPCOM/000125143, May 20, 2005; U.S. Pat. No. 4,973,607. However, this method has not been able to limit nitrosamine levels to less than 15 ng/L.

The invention seeks to eliminate or lessen the water pre-washing of an anion exchange resin by adding a cation exchange resin to the anion exchange resin. The use of cation exchange resins slow or eliminate nitrosamine formation on the anion exchange resin. With the blending of a cation exchange resin with the anion exchange resin, as trace amounts of amine are released from the anion exchange resin, the active functional group of the cation exchange resin binds the amine and thus limits its availability to further react to form N-nitrosamines.

In a first aspect of the invention, there is provided a method for inhibiting formation of nitrosamines comprising providing an anion exchange resin with a nitrosating agent, and mixing a cation exchange resin with the anion exchange resin to inhibit formation of nitrosamines on the anion exchange resin such the anion exchange resin comprises no more than 15 ng/L nitrosamines.

In a second aspect of the invention, there is provided an anion exchange resin comprising a resin having a crosslinked polycondensate of phenol formaldehyde, an amine, and a nitrosating agent, a cation exchange resin mixed with the anion exchange resin that inhibits formation of nitrosamines on the resin, and no more than 15 ng/L nitrosamines.

The invention is directed to a method for inhibiting nitrosamine formation in anion exchange resins. An anion exchange resin with a nitrosating agent is provided. The anion exchange resin, preferably, comprises a crosslinked polycondensate of phenol formaldehyde and an amine. In a preferred embodiment, the anion exchange resin comprises dimethyl amine, trimethylamine, triethylamine, tripropylamine, tri-n-butyl amine, or mixtures thereof.

The anion exchange resins may be in the form of a gel or macroporous beads. If the anion exchange resins are in the form of macroporous spherical beads, they typically have an average particle diameters from 100 μm to 2 mm and a surface area from about 10 to 1000 square meters/gram ($m^2/g$). The crosslinked copolymer particles may have a Gaussian particle size distribution, but preferably have a relatively uniform particle size distribution, i.e. "monodisperse," i.e., at least 90 volume percent of the beads have a particle diameter from about 0.9 to about 1.1 times the volume average particle diameter.

The anion exchange resins may be prepared from crosslinked macroporous copolymers, which are polymers or copolymers polymerized from a monomer or mixture of monomers containing at least 1 weight percent, based on the total monomer weight, of polyvinyl unsaturated monomer. Porosity may be introduced into the copolymer beads by suspension-polymerization in the presence of a porogen (also known as a "phase extender" or "precipitant"), that is, a solvent for the monomer, but a non-solvent for the polymer.

The copolymer particles may be prepared by suspension polymerization of a finely divided organic phase comprising monovinylidene monomers such as styrene, crosslinking monomers such as divinylbenzene, a free-radical initiator, and optionally, a phase-separating diluent. The terms "gel-type" and "macroporous" are well-known in the art and generally describe the nature of the copolymer particle porosity. The term "macroporous" as commonly used in the art means that the copolymer has both macropores and mesopores. The terms "macroporous," "gellular," "gel" and "gel-type" are synonyms that describe copolymer particles having pore sizes less than about 20 Å (Angstroms), while macroporous copolymer particles have both mesopores of from about 20 Å to about 500 Å and macropores of greater than about 500 Å. Gel-type and macroporous copolymer particles, as well as their preparation, are further described in U.S. Pat. No. 4,256,840 and U.S. Pat. No. 5,244,926, the entire contents of which are incorporated herein by reference.

Suitable monomers that may be used in the preparation of the crosslinked copolymers include, for example, one or more monomers selected from divinylbenzene, trivinylbenzene, divinyltoluene, divinylnaphthalene and divinylxylene, and mixtures thereof; it is understood that any of the various positional isomers of each of the aforementioned crosslinkers is suitable. In a preferred embodiment, the polyvinylaromatic monomer is divinylbenzene.

Optionally, non-aromatic crosslinking monomers, such as ethyleneglycol diacrylate, ethyleneglycol dimethacrylate, trimethylolpropane triacrylate, trimethylolpropane trimethacrylate, diethyleneglycol divinyl ether, and trivinylcyclohexane, may be used in addition to the polyvinylaromatic crosslinker.

Suitable monounsaturated vinylaromatic monomers that may be used in the preparation of crosslinked copolymers include, for example, styrene, α-methylstyrene, ($C_1$-$C_4$) alkyl-substituted styrenes, halo-substituted styrenes (such as dibromostyrene and tribromostyrene), vinylnaphthalene, and vinylanthracene. Preferably, the monounsaturated vinylaromatic monomer is selected from styrene, ($C_1$-$C_4$)alkyl-substituted styrenes, and mixtures thereof. Included among the suitable ($C_1$-$C_4$)alkyl-substituted styrenes are, for example, ethylvinylbenzenes, vinyl toluenes, diethylstyrenes, ethylmethylstyrenes, and dimethylstyrenes. It is understood that any of the various positional isomers of each of the aforementioned vinylaromatic monomers is suitable. Optionally, non-aromatic monounsaturated vinyl monomers, such as aliphatic unsaturated monomers, for example, vinyl chloride, acrylonitrile, (meth)acrylic acids, and alkyl(meth)acrylates, may be used in addition to the vinylaromatic monomer.

Porogens may also be used in preparing macroporous copolymers. Suitable porogens include hydrophobic porogens, such as ($C_7$-$C_{10}$) aromatic hydrocarbons and ($C_6$-$C_{12}$) saturated hydrocarbons, and hydrophilic porogens, such as ($C_4$-$C_{10}$)alkanols and polyalkylene glycols. Suitable ($C_7$-$C_{10}$)aromatic hydrocarbons include, for example, one or more of toluene, ethylbenzene, ortho-xylene, meta-xylene and para-xylene; it is understood that any of the various positional isomers of each of the aforementioned hydrocarbons is suitable. Preferably, the aromatic hydrocarbon is toluene or xylene or a mixture of xylenes or a mixture of toluene and xylene. Suitable ($C_6$-$C_{12}$) saturated hydrocarbons include, for example, one or more of hexane, heptane and isooctane; preferably, the saturated hydrocarbon is isooctane. Suitable ($C_4$-$C_{10}$)alkanols include, for example, one or more of isobutyl alcohol, tert-amyl alcohol, n-amyl alcohol, isoamyl alcohol, methyl isobutyl carbinol (4-methyl-2-pentanol), hexanols and octanols; preferably, the alkanol is selected from one or more ($C_5$-$C_8$)alkanols, such as, methyl isobutyl carbinol and octanol.

Polymerization initiators useful in preparing copolymers include monomer-soluble initiators, such as peroxides, hydroperoxides and related initiators, for example benzoyl peroxide, tert-butyl hydroperoxide, cumene peroxide, tetralin peroxide, acetyl peroxide, caproyl peroxide, tert-butyl peroctoate (also known as tert-butylperoxy-2-ethylhexanoate), tert-amyl peroctoate, tert-butyl perbenzoate, tert-butyl diperphthalate, dicyclohexyl peroxydicarbonate, di(4-tert-butylcyclohexyl)peroxydicarbonate, and methyl ethyl ketone peroxide. Also useful are azo initiators, such as azodiisobutyronitrile, azodiisobutyramide, 2,2'-azo-bis(2,4-dimethylvaleronitrile), azo-bis(.α-methylbutyronitrile) and dimethyl-, diethyl- or dibutyl azo-bis(methylvalerate).

The copolymer may include a quaternary ammonium functionality comprising a nitrogen atom bonded to a benzyl carbon of the copolymer and three alkyl groups, wherein each alkyl group independently comprises from 1 to 8 carbon atoms. The copolymer may be functionalized via any conventional processes, such as haloalkylation (e.g., chloromethylation) followed by amination (e.g., via reaction with a tertiary amine such as tributyl amine).

Catalysts useful for conducting haloalkylation reactions are well known and are often referred to in the art as a "Lewis acid" or "Friedel-Crafts" catalyst. Nonlimiting examples include zinc chloride, zinc oxide, ferric chloride, ferric oxide, tin chloride, tin oxide, titanium chloride, zirconium chloride, aluminum chloride, sulfuric acid, and combinations thereof. Halogens other than chloride may also be used.

Solvents and/or swelling agents may also be used in the haloalkylation reaction. Examples of suitable solvents include aliphatic hydrocarbon halides, such as ethylene dichloride, dichloropropane, dichloromethane, chloroform, diethyl ether, dipropyl ether, dibutyl ether, diisoamyl ether, and combinations thereof.

Once haloalkylated, the resin may be aminated via conventional processes such as described in U.S. Publication No. 2004/025697; U.S. Pat. No. 4,564,644 and U.S. Pat. No. 6,924,317, the entire contents of which are incorporated herein by reference. Amination may be performed by combining the haloalkylated resin (preferably, pre-washed) with an amine solution. The amine species is preferably a tertiary amine when strong base anion resins are required and secondary or primary amines when weak base anion resins are desired. The amine solution may comprise a slurry solvent of alcohol (e.g., methanol) and optionally water and may include a swelling agent, such as methylal or ethylene dichloride. The amine solution may also include an inorganic salt such as sodium chloride. Additionally, the pH of the amine solution may be adjusted to 7 or slightly alkaline.

The nitrosating agent of the anion exchange resin may comprise any material capable of nitrosating a nitrosatable nitrogen functional group. Such nitrosating agents include nitrite salts, such as $N_2O_3$, and are generally thought to nitrosate by reaction of the nitrosonium ion with the amine from the resin. These nitrosating agents may be contained as trace impurities in the raw amines used to manufacture the anion resins as trace $NO_2^-$ from water or salt sources that further degrade to transient $NO^+$ species as side products generated during storage. Such species can then further react with trace amines in the resin to generate N-nitrosamines.

The method further includes mixing a cation exchange resin with the anion exchange resin to inhibit formation of nitrosamines on the anion exchange resin. Nitrosamines include N-Nitrosodiethylamine (NDEA), N-Nitrosodimethylamine (NDMA), N-Nitrosodi-n-propylamine (NDPA), N-Nitrosodi-n-butylamine (NDBA), N-Nitrosomethylethylamine (NMEA), N-Nitrosomorpholine, N-Nitrosopiperidine (NPIP), N-nitrosodiethanolamine (NDELA), N-nitrosomorpholine (NMOR), N-nitrosodicyclohexylamine, N-nitrosodicyclohexylamine, N-nitrosomethyl(benzyl) amine, N-nitrosonornicotine, and N-Nitrosopyrrolidine (NYPR).

The classical synthesis of N-nitrosamines is the reaction of a secondary amine with acidic nitrite at a pH of about 3 or less. Nitrous acid ($HNO_2$) or its anhydride ($N_2O_3$) is the nitrosating agent. Nitrite ions react with protons in aqueous solution to produce nitrous acid and $N_2O_3$.

The reaction is pH dependent, where the greater the concentration of protons, the more nitrous acid that is produced as the equilibrium is pushed to the right of the stoichiometric equation.

It is assumed that the direct nitrosating species is the nitronium ion ($NO^+$) produced by ionic dissociation of nitrous acid or $N_2O_3$.

This species may react with secondary amities expelling a proton to produce a nitrosamine.

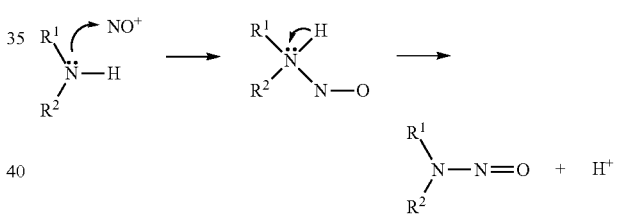

The cation exchange resin mixed with the anion exchange resin disrupts the nitronium ion formation by ionic binding any excess amine compounds or binding excess acid to limit nitronium ion formation. As trace amounts of amine are released from the anion exchange resin, the active functional group of the cation exchange resin binds the amine and thus limits its availability to further react to form N-nitrosamines. By reducing the levels of free amine in the system, the mechanisms by which nitrosamines can form are disrupted.

Cation exchange resins useful in the invention are substances that inhibit nitrosamine formation and include strong acid cations and weak acid cations. Suitable cation exchange resins include sulfonated polymer of at least one of styrene, ethylstyrene, and divinylbenzene, a sulfonated divinylbenzene/styrene copolymer, an acrylic copolymer, a divinylbenzene crosslinked polyacrylate polymer, and combinations thereof. Examplary cation exchange resins include DOWEX™ MARATHON™ 650C (H), DOWEX MARATHON C, DOWEX MARATHON C-10, DOWEX MONOSPHERE™ C-350, DOWEX MONOSPHERE C-400, DOWEX HCR-S/S, DOWEX HCR-S/S FF, DOWEX MARATHON MSC, DOWEX UPCORE™ Mono C-600, DOWEX MONOSPHERE 650C (H), DOWEX MONOSPHERE 650HXC (H), DOWEX MONOSPHERE 6SOHXC NG (H), DOWEX HCR-W2, DOWEX HGR-W2, DOWEX MONOSPHERE 575C NG (H), DOWEX MONO- SPHERE 650C UPW (H), DOWEX MONOSPHERE 650C NG (H), DOWEX HGR NG (H), DOWEX DR-G8, DOWEX 88 MB, DOWEX 88 MB (H), DOWEX 88, DOWEX 88 (H), DOWEX MONOSPHERE 88, DOWEX MONOSPHERE 88 (H), DOWEX MONOSPHERE C-600 B, DOWEX MONOSPHERE 575C (H), DOWEX MONOSPHERE 545C (H), DOWEX MONOSPHERE 545C NG (H), DOWEX MONOSPHERE MP-525C (H), DOWEX MONOSPHERE 750C (H), DOWEX MONOSPHERE M-31, DOWEX MONOSPHERE DR-2030, DOWEX UPCORE Mono MC-575 (H), DOWEX UPCORE Mono IF-62, DOWEX M-31, DOWEX N406, DOWEX G-26 (H), DOWEX MONOSPHERE 99Ca/320, DOWEX MONOSPHERE 99Ca/350, DOWEX MONOSPHERE 99K/320, DOWEX MONOSPHERE 99K/350, DOWEX C-75 NG (H), DOWEX CM-15, DOWEX HCR-S, DOWEX HGR, DOWEX HGR NG (NH4), DOWEX MAC-3 LB, AMBERJET 1300 H, AMBERJET 1300 Na, AMBERJET 1500 H, AMBERJET UP1400, AMBERLITE™ UP252, AMBERLITE CR1310 Ca, AMBERLITE CR1320 Ca, AMBERLITE CR1320 K, AMBERLITE FPC11 Na, AMBERLITE FPC14 Na, AMBERLITE FPC22 H, AMBERLITE FPC22 Na, AMBERLITE FPC23 H, AMBERLITE SR1L Na, AMBERLITE IR120 H, AMBERLITE IR120 Na, AMBERLITE IRN77, AMBERLITE IRN97 H, AMBERLITE IRN99, AMBERLITE IRP69, AMBERLYST™ 131Wet, AMBERLYST BD10Dry, AMBERLYST 15Dry, AMBERLYST 15Wet, AMBERLYST 16Wet, AMBERLYST 31Wet, AMBERLYST 33, AMBERLYST 35Dry, AMBERLYST 35Wet, AMBERLYST 36Dry, AMBERLYST 36Wet, AMBERLYST 39Wet, AMBERLYST 40Wet, AMBERLYST 70, AMBERLYST CH10, AMBERLYST CH28, AMBERLYST 121Wet, DOWEX MAC-3, AMBERLITE IRC76, AMBERLITE IRC747, AMBERLITE IRC748, AMBERLIE IRC86, AMBERLITE IRC86SB, AMBERLITE IRP64, AMBERSEP™ GT74, and IMAC® HP336, all of which are available at The Dow Chemical Company, Midland, Mich.

Preferably, the weight ratio of the anion exchange resin to the cation exchange resin is at least 100:1. However, levels as low as a weight ratio of 500:1 still offer a mechanism to bind free amine and disrupt N-nitrosamine formation. For longer term storage or higher than ambient storage temperatures, a weight ratio formulation with more cation exchange resin in the range of 50:1 anion to cation is preferred.

Typically, the cation exchange resin is mixed with the anion exchange resin. The mixture may occur at the point of packaging by adding small amounts of the cation exchange resin to the anion exchange resin as the product is being filled in, for example, drums or bags. Alternatively, the cation exchange resin may be added in aliquots to the anion exchange resin as if passes on drier belts prior to being packaged.

When the formation of the nitrosamines are inhibited according to the invention, the anion exchange resin comprises, preferably, no more than 15 ng/L nitrosamines, more preferably, no more than 10 ng/L nitrosamines, and most preferably, no more than 5 ng/L nitrosamines. With the ranges being as low as non-detect, the volumes of pre-wash resin rinsing lessen and, in some cases, are not needed before the resin bed can be brought into service.

The invention is also directed to an anion exchange resin comprising a resin having a crosslinked polycondensate of phenol formaldehyde, an amine, and a nitrosating agent, a cation exchange resin mixed with the anion exchange resin that inhibits formation of nitrosamines on the resin, and no more than 15 ng/L nitrosamines. During storage, this anion exchange resin mixed with cation exchanger resin offers less development of trace nitrosamines, which eliminates or greatly reduces the volumes of pre-water rinse required in order to use the resins for such applications as perchlorate, nitrate, and other potable water applications.

The following examples are presented to illustrate the invention. In the examples, the following abbreviations have been used.

DI is deionized.

g is gram; ng is nanograms; ppm is parts per million; L is liter; and mL is milliliter.

DOWEX 1 is a type I strong base anion resin, trimethyl amine in the $Cl^-$ form, on a gel copolymer available from The Dow Chemical Company, Midland, Mich.

DOWEX PSR-2 is a tri-n-butyl amine resin, $Cl^-$ form, on a gel copolymer available from The Dow Chemical Company, Midland, Mich.

DOWEX 66 is DOWEX 66 is a dimethylamine, weak base anion resin, in the free base form, on a macroporous copolymer available from The Dow Chemical Company, Midland, Mich.

Test Methods

Baseline Data:

To initially establish baseline data on various DOWEX™ anion resins and to secure some comparative testing information between analytical methods, simple bottle extractions were evaluated using a static testing method as follows. Stable isotopically labeled analogs of the compounds of interest were added to a one liter wastewater sample. The sample was extracted at a pH of 12-13, then at pH<2 with methylene chloride using continuous extraction techniques. The extract was dried over sodium sulfate and concentrated to a volume of 1 mL. An internal standard was added to the extract, and the extract was injected into the gas chromatograph (GC). The compounds were separated by GC and detected by a mass spectrometer (MS). The labeled compounds served to correct the variability of the analytical technique. Identification of a compound (qualitative analysis) was performed by comparing the GC retention time and background corrected characteristic spectral masses with those of authentic standards. Quantitative analysis was performed by GC/MS using extracted ion current profile (EICP) areas. Isotope dilution was used when labeled compounds were available; otherwise, an internal standard method was used.

Nitrosamine Testing:

Samples were sent to a nitrosamine testing labs, such as Test America, West Sacramento, Calif., Week Labs Inc., Industry, Calif., and MWH Laboratories, Scottsdale Ariz. These labs conduct Unregulated Contaminant Monitoring Regulation 2 (UCMR2) List 2 (Herbicides, Herbicide Degradation Products, and Nitrosamines) testing services. UCMR2 is a federal monitoring requirement sponsored by the EPA as part of a program that investigates chemical, radiological and microbiological contaminant occurrence in an effort to characterize drinking water threats.

EXAMPLES

As an initial scouting effort, work was completed using solutions of anion exchange resins and anion with cation exchange resins in the presence of bleach. Jars 1-9 were sampled and sent to MWH Laboratories for nitrosamine analysis. Following that, an additional 1500 mL of 500 ppm $Cl^-$ solution (as NaOCl) was added to each jar and agitated. The samples were allowed to equilibrate for a further period of 30 days prior to sampling for additional nitrosamine testing. Jars 1-9 were sampled and sent to MWH Laboratories for nitrosamine analysis.

Results

| Jar No. | Anion Resin | Anion Resin (g) | Cation Resin | Cation Resin (g) | mL 500 ppm Cl— | NDMA (ng/L) | NDBA (ng/L) |
|---|---|---|---|---|---|---|---|
| 1 | DOWEX 1 | 500.04 | None | 0 | 1500 | 12 | 0 |
| 2 | DOWEX PSR-2 | 500 | None | 0 | 1500 | 0 | 88 |
| 3 | DOWEX 66 | 500 | None | 0 | 1500 | 140 | 0 |
| 4 | DOWEX 1 | 499.97 | DOWEX MARATHON C | 5.01 | 1500 | 0 | 0 |
| 5 | DOWEX PSR-2 | 499.99 | DOWEX MARATHON C | 5.01 | 1500 | 12 | 9.2 |
| 6 | DOWEX 66 | 499.98 | DOWEX MARATHON C | 5.02 | 1500 | 0 | 0 |
| 7 | DOWEX 1 | 500.01 | DOWEX MAC-3 | 4.98 | 1500 | 0 | 0 |
| 8 | None (Blank Cl⁻) | 0 | None | 0 | 1500 | 43 | 0 |
| 9 | DI water | | | | | 0 | 0 |

What is claimed is:

1. A method for inhibiting formation of nitrosamines comprising:
   providing an anion exchange resin together with a nitrite salt, wherein the amount of the nitrite salt is 1000 ng/L or less; and
   then mixing a cation exchange resin with the anion exchange resin together with the nitrite salt to inhibit formation of nitrosamines on the anion exchange resin together with the nitrite salt such that the anion exchange resin together with the nitrite salt comprises no more than 15 ng/L nitrosamines,
   wherein the mixing comprises adding cation exchange resin to the anion exchange resin in a weight ratio of anion exchange resin to cation exchange resin of from 500:1 to 50:1.

2. The method of claim 1 wherein the anion exchange resin comprises a crosslinked polycondensate of an amine and a phenol formaldehyde.

3. The method of claim 2 wherein the amine comprises at least one of dimethylamine, trimethylamine, tri-n-propylamine, and tri-n-butylamine.

4. The method of claim 1 wherein the cation exchange resin comprises a polymer selected from the group consisting of a sulfonated polymer of at least one of styrene, ethylstyrene, and divinylbenzene, a sulfonated divinylbenzene/styrene copolymer, an acrylic copolymer, a divinylbenzene crosslinked polyacrylate polymer, and combinations thereof.

5. The method of claim 1 further comprising:
   disrupting a mechanism of nitrosamine formation by at least one of ionic binding any excess amine compounds and binding excess acid to limit nitronium ion formation.

6. An anion exchange resin prepared using the method of claim 1.

* * * * *